US012263790B1

(12) United States Patent
Zhu

(10) Patent No.: US 12,263,790 B1
(45) Date of Patent: Apr. 1, 2025

(54) MULTIFUNCTIONAL FIXED BRACKET

(71) Applicant: Guangdong Aoyun Technology Co., Ltd., Guangdong (CN)

(72) Inventor: Xueping Zhu, Guangdong (CN)

( * ) Notice: Subject to any disclaimer, the term of this patent is extended or adjusted under 35 U.S.C. 154(b) by 0 days.

(21) Appl. No.: 18/677,144

(22) Filed: May 29, 2024

(30) Foreign Application Priority Data

May 23, 2024 (CN) .......................... 202421146940.7

(51) Int. Cl.
*B60R 11/00* (2006.01)
*B60N 3/10* (2006.01)
*B60R 7/04* (2006.01)

(52) U.S. Cl.
CPC ................ *B60R 11/00* (2013.01); *B60N 3/10* (2013.01); *B60R 7/043* (2013.01); *B60R 2011/0075* (2013.01)

(58) Field of Classification Search
CPC ..... B60R 2011/0075; B60R 2011/0012; B60R 2011/0017; B60R 7/043; B60N 3/103
USPC ............. 224/275, 926; 248/311.2; D7/619.1, D7/620, 601, 602
See application file for complete search history.

(56) References Cited

U.S. PATENT DOCUMENTS

| | | | | |
|---|---|---|---|---|
| 3,526,314 A * | 9/1970 | Trammell, Jr. | ......... | B60N 3/08 224/547 |
| 4,655,425 A * | 4/1987 | Wallace | .................. | B60N 3/18 248/499 |
| 4,678,154 A * | 7/1987 | McFarland | ............... | A47K 1/08 248/300 |
| 4,697,780 A * | 10/1987 | Wenkman | ............ | F16M 11/041 248/314 |
| 4,702,446 A * | 10/1987 | Brown | ..................... | E06C 7/143 248/210 |
| 4,749,112 A * | 6/1988 | Harper | ................... | B60N 3/108 224/567 |
| 4,757,928 A * | 7/1988 | Browne | .................. | B60R 7/043 224/926 |
| 4,765,581 A * | 8/1988 | Wallace | ................... | B60N 3/18 248/308 |
| 4,779,831 A * | 10/1988 | Anderson | .............. | B60N 3/103 248/205.2 |
| 4,844,400 A * | 7/1989 | Jasmagy, Jr. | .......... | B60N 3/103 248/314 |

(Continued)

FOREIGN PATENT DOCUMENTS

DE 202009008901 U1 * 3/2010 ............. B60N 3/002

*Primary Examiner* — Justin M Larson

(57) ABSTRACT

A multifunctional fixed bracket includes a bracket body and a first supporting body. The bracket body is provided with an accommodating chamber. The accommodating chamber is configured to place a container. The first supporting body is connected to the bracket body, and the first supporting body is configured to hang items. Through the above structure, since the bracket body is provided with the accommodating chamber, a user can place a container such as a water glass, a beverage bottle, and an umbrella into the accommodating chamber, and can hang an item such as a key, an earphone, a bag, and a garbage bag on a first supporting member at a bottom of the bracket body, fully using a space of the fixed bracket, increasing the versatility of the bracket, and allowing the user to store various items on one fixed bracket, thereby improving the space utilization rate and cleanliness.

18 Claims, 7 Drawing Sheets

(56) References Cited

U.S. PATENT DOCUMENTS

| | | | | |
|---|---|---|---|---|
| 5,106,046 A * | 4/1992 | Rowles | | B60N 3/103 |
| | | | | 248/214 |
| D340,622 S * | 10/1993 | Park | | D6/513 |
| D401,121 S * | 11/1998 | Hartmann | | D7/620 |
| 5,938,160 A * | 8/1999 | Hartmann | | F16M 13/022 |
| | | | | 248/909 |
| D413,464 S * | 9/1999 | Richter | | D12/416 |
| 6,484,989 B1 * | 11/2002 | Connery | | A47D 15/00 |
| | | | | 108/26 |
| 6,513,686 B1 * | 2/2003 | Ben-Sasson | | B60N 2/809 |
| | | | | 215/388 |
| D476,815 S * | 7/2003 | Richter | | D3/328 |
| 6,641,102 B2 * | 11/2003 | Veltri | | B60N 3/107 |
| | | | | 220/737 |
| 7,036,784 B2 * | 5/2006 | Peitzmeier | | B60N 3/102 |
| | | | | 248/311.2 |
| 7,284,737 B2 * | 10/2007 | Kane | | A47G 23/0225 |
| | | | | 248/311.2 |
| 7,611,114 B1 * | 11/2009 | Griffin | | A45F 5/00 |
| | | | | 248/314 |
| 7,793,904 B2 * | 9/2010 | Scarton | | A47G 23/0225 |
| | | | | 248/230.5 |
| 8,397,963 B2 * | 3/2013 | Singh | | B60R 7/043 |
| | | | | 224/564 |
| 8,757,573 B1 * | 6/2014 | Barnes, Jr. | | A47G 23/0225 |
| | | | | 224/558 |
| 8,777,307 B2 * | 7/2014 | Nelson | | B60N 2/24 |
| | | | | 297/188.14 |
| D813,241 S * | 3/2018 | Wengreen | | D14/496 |
| D856,320 S * | 8/2019 | Li | | D14/447 |
| D951,717 S * | 5/2022 | Buelow, Jr. | | D7/620 |
| D1,031,378 S * | 6/2024 | Dees | | D7/619.1 |
| 2004/0222345 A1 * | 11/2004 | Lindsay | | B60N 3/103 |
| | | | | 248/231.61 |
| 2012/0018471 A1 * | 1/2012 | Guillermo | | B60R 11/0235 |
| | | | | 224/275 |
| 2014/0110446 A1 * | 4/2014 | Carter | | B60R 11/00 |
| | | | | 224/275 |
| 2015/0115009 A1 * | 4/2015 | Stauber | | B60R 11/02 |
| | | | | 224/275 |
| 2023/0264618 A1 * | 8/2023 | Tuttle | | A47G 29/093 |
| | | | | 220/737 |

\* cited by examiner

MULTIFUNCTIONAL FIXED BRACKET

CROSS-REFERENCE TO RELATED APPLICATIONS

The application claims priority of Chinese patent application CN2024211469407, filed on May 23, 2024, which is incorporated herein by reference in its entireties.

TECHNICAL FIELD

The present disclosure relates to the field of fixed brackets, and in particular, to a multifunctional fixed bracket.

BACKGROUND

With the development of technology and the times, automobiles have become a common transportation tool in people's life. However, during the use of an automobile, especially when a family with a large number of people goes out or when there are many passengers, people would usually carry many items. However, due to a limited design space inside the automobile, there is no room to hang and place most of the items. In response to this phenomenon, many automobile owners would hang a hook bracket on a metal rod of a headrest of an automobile seat. However, at preset, the hook bracket on the existing market can only be used for hanging items, with a single function and low utilization rate.

SUMMARY

To overcome the shortcomings in the prior art, the present disclosure provides a multifunctional fixed bracket, which solves the defect that an existing fixed bracket can only be used for hanging items, with a single function and low utilization rate.

The technical solution adopted by the present disclosure to solve the technical problem is as follows.

The present disclosure provides a multifunctional fixed bracket, including:
 a bracket body, wherein the bracket body is provided with an accommodating chamber, and the accommodating chamber is configured to place a container; and
 a first supporting body, wherein the first supporting body is connected to the bracket body, and the first supporting body is configured to hang items.

As an improvement of the present disclosure, the bracket body is connected to a fixing device; and the bracket body is connected to an automobile seat through the fixing device.

As an improvement of the present disclosure, the bracket body is further connected to a second supporting body.

As an improvement of the present disclosure, the first supporting body and the second supporting body are arranged at a bottom of the bracket body, and both the first supporting body and the second supporting body are hooks.

As an improvement of the present disclosure, the first supporting body and the second supporting body are both U-shaped or J-shaped hooks, and a contact and connection part between the first supporting body and the hung item and a contact and connection part between the second supporting body and the hung item are arc-shaped.

As an improvement of the present disclosure, a third supporting body is arranged on one side wall of the bracket body, and a fourth supporting body is arranged on the other opposite side wall of the bracket body.

As an improvement of the present disclosure, both the third supporting body and the fourth supporting body are hooks.

As an improvement of the present disclosure, the third supporting body and the fourth supporting body are both U-shaped or J-shaped hooks, and a contact and connection part between the third supporting body and the hung item and a contact and connection part between the fourth supporting body and the hung item are arc-shaped.

As an improvement of the present disclosure, a pressing device is arranged in the accommodating chamber; and when the container is placed in the accommodating chamber, the pressing device presses the container against the accommodating chamber.

As an improvement of the present disclosure, the pressing device is an elastic sheet protruding inwards from an inner wall of the bracket body.

As an improvement of the present disclosure, the bracket body is detachably connected to the fixing device.

As an improvement of the present disclosure, the fixing device includes a transverse fixing portion and a longitudinal fixing portion; the transverse fixing portion is configured to be connected to a metal rod of a headrest of an automobile; and the longitudinal fixing portion is configured to fix and support the bracket body.

As an improvement of the present disclosure, the transverse fixing portion is a transverse fixing plate, and the transverse fixing plate is provided with a clamping slot configured to be hung on the metal rod of the headrest of the automobile seat.

As an improvement of the present disclosure, the longitudinal fixing portion is a longitudinal fixing plate; the longitudinal fixing plate includes a first fixing plate and a second fixing plate which are connected into a U shape; the first fixing plate is connected to one end of the transverse fixing plate away from the clamping slot; and the second fixing plate is connected to one side of the first fixing plate away from the transverse fixing plate.

As an improvement of the present disclosure, a fixing slot with a downward opening is arranged on a back portion of the bracket body; and the fixing slot clamps and sleeves the second fixing plate through the opening of the bracket body.

As an improvement of the present disclosure, outwards protruding elastic buckles are arranged on left and right side walls of the second fixing plate, and a groove matched and clamped with the elastic buckles is arranged in the fixing slot.

As an improvement of the present disclosure, a positioning protrusion is further arranged between the first fixing plate and the second fixing plate; a positioning groove is arranged on one side, close to the opening, of the back portion of the bracket body; and the positioning protrusion is matched and clamped with the positioning groove.

As an improvement of the present disclosure, the bracket body includes a first portion, a second portion, and a third portion; the first portion is connected to one side of the second portion; the third portion is connected to the other side of the second portion; the first portion is provided with a first top wall; the second portion is provided with a second top wall; the third portion is provided with a third top wall; the second top wall is lower than the first top wall and the third top wall, so that a sunken supporting slot is formed in an upper part of the bracket body; and the supporting slot is configured to place and support a mobile phone.

As an improvement of the present disclosure, the third top wall is higher than the first top wall.

As an improvement of the present disclosure, a first air vent is arranged at a bottom of the bracket body, and a second air vent is arranged on a surrounding wall of the bracket body.

The present disclosure has the beneficial effects: The present disclosure provides a multifunctional fixed bracket. The multifunctional fixed bracket includes a bracket body; the bracket body is provided with an accommodating chamber, and the accommodating chamber is configured to place a container; and a first supporting body, wherein the first supporting body is connected to the bracket body, and the first supporting body is configured to hang items. Through the above structure, since the bracket body is provided with the accommodating chamber, a user can place a container such as a water glass, a beverage bottle, and an umbrella into the accommodating chamber, and can hang an item such as a key, an earphone, a bag, and a garbage bag on a first supporting member at a bottom of the bracket body, fully using a space of the fixed bracket, increasing the versatility of the bracket, and allowing the user to store various items on one fixed bracket, thereby improving the space utilization rate and cleanliness.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
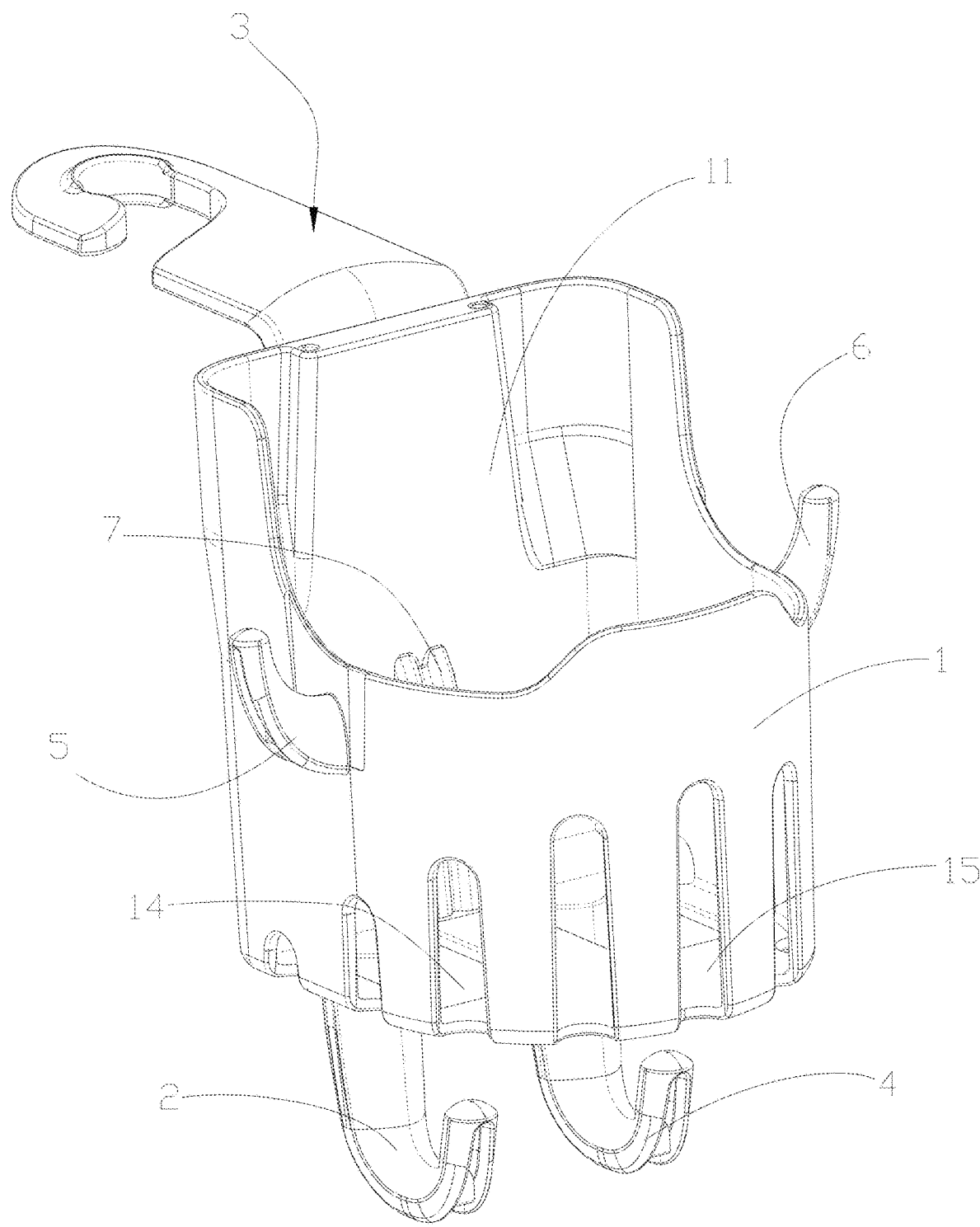
FIG. 1 is a schematic diagram of an entire structure of the present disclosure.
Figure 2:
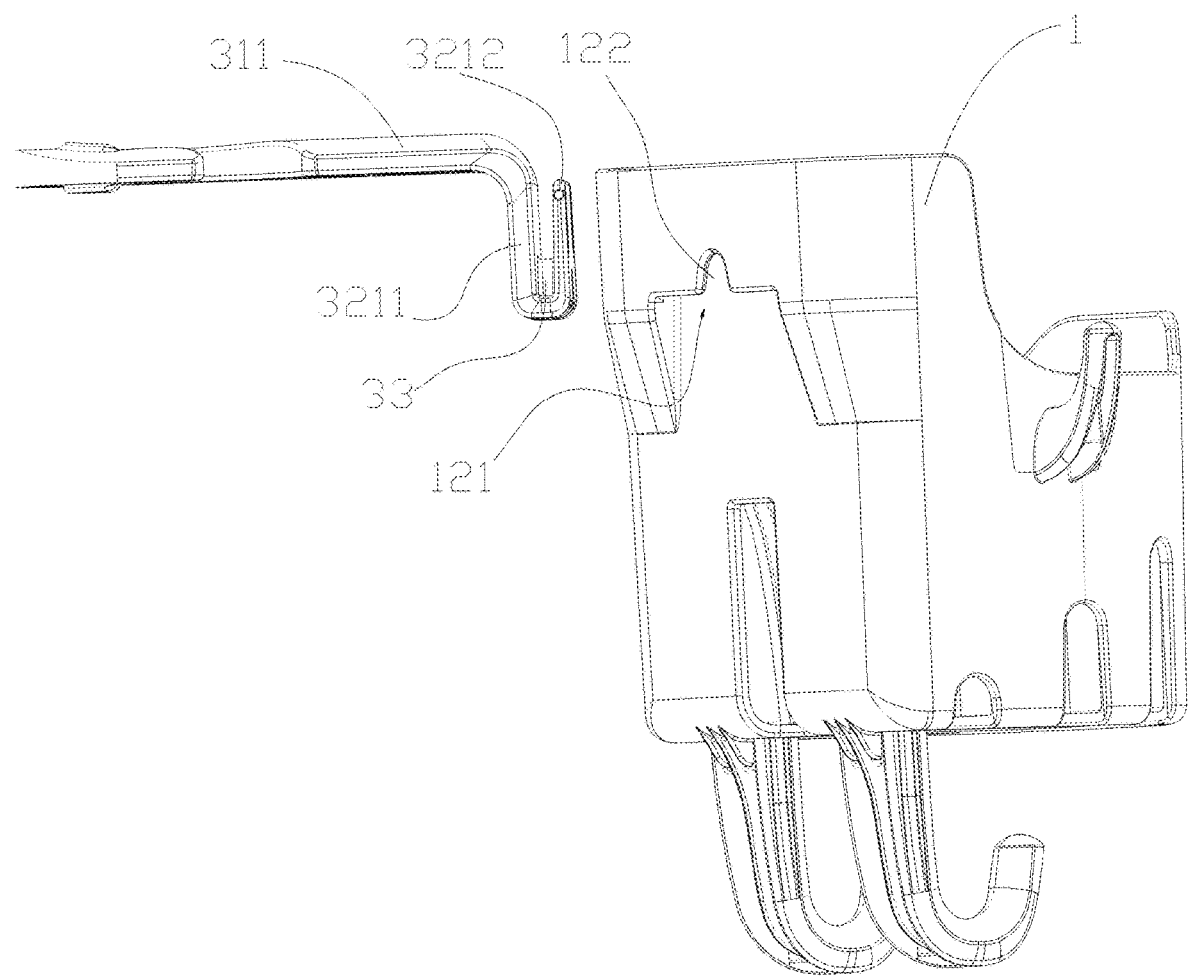
FIG. 2 is an exploded view of the present disclosure.
Figure 3:
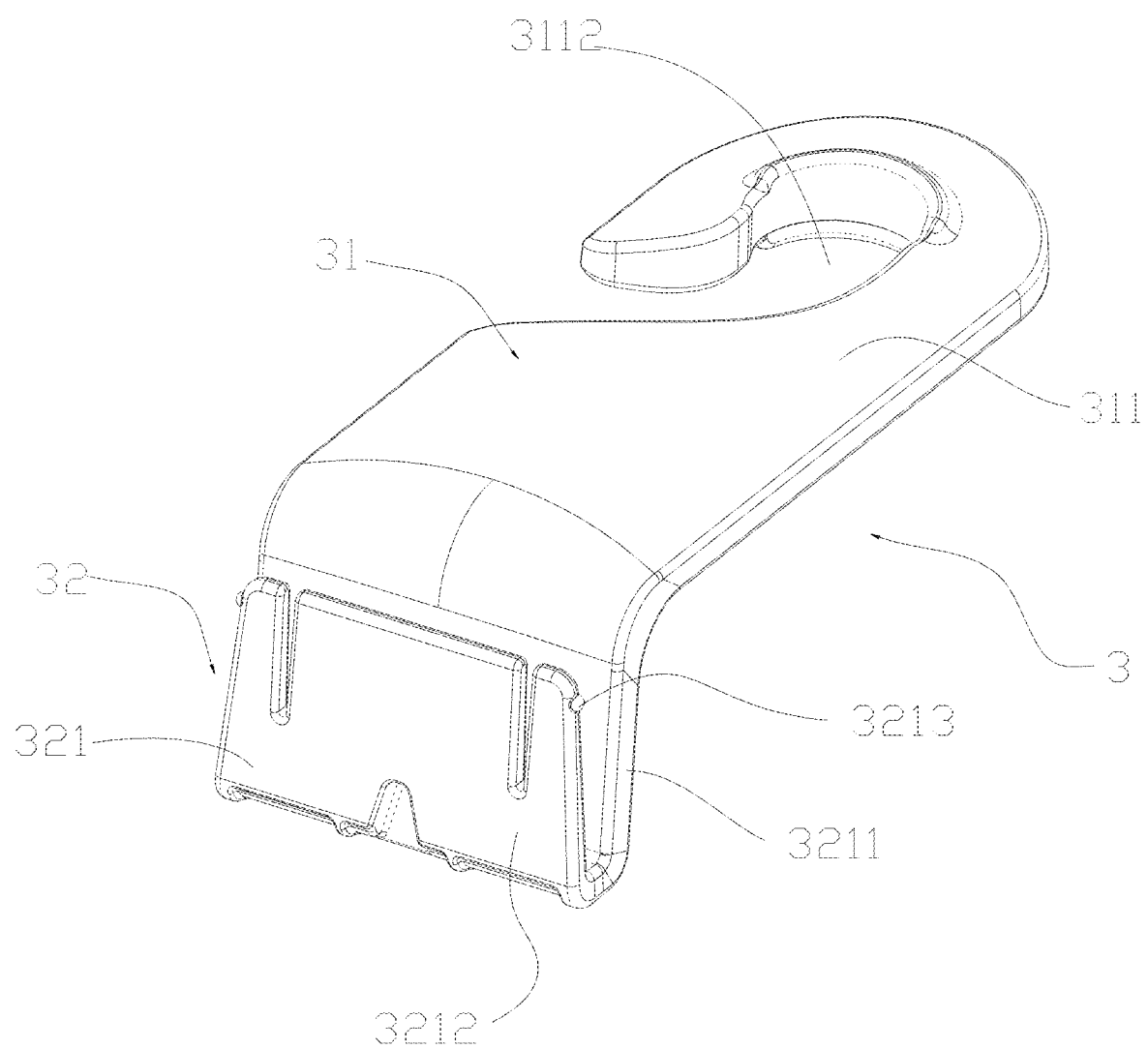
FIG. 3 is a schematic structural diagram of a fixing device of the present disclosure.
Figure 4:
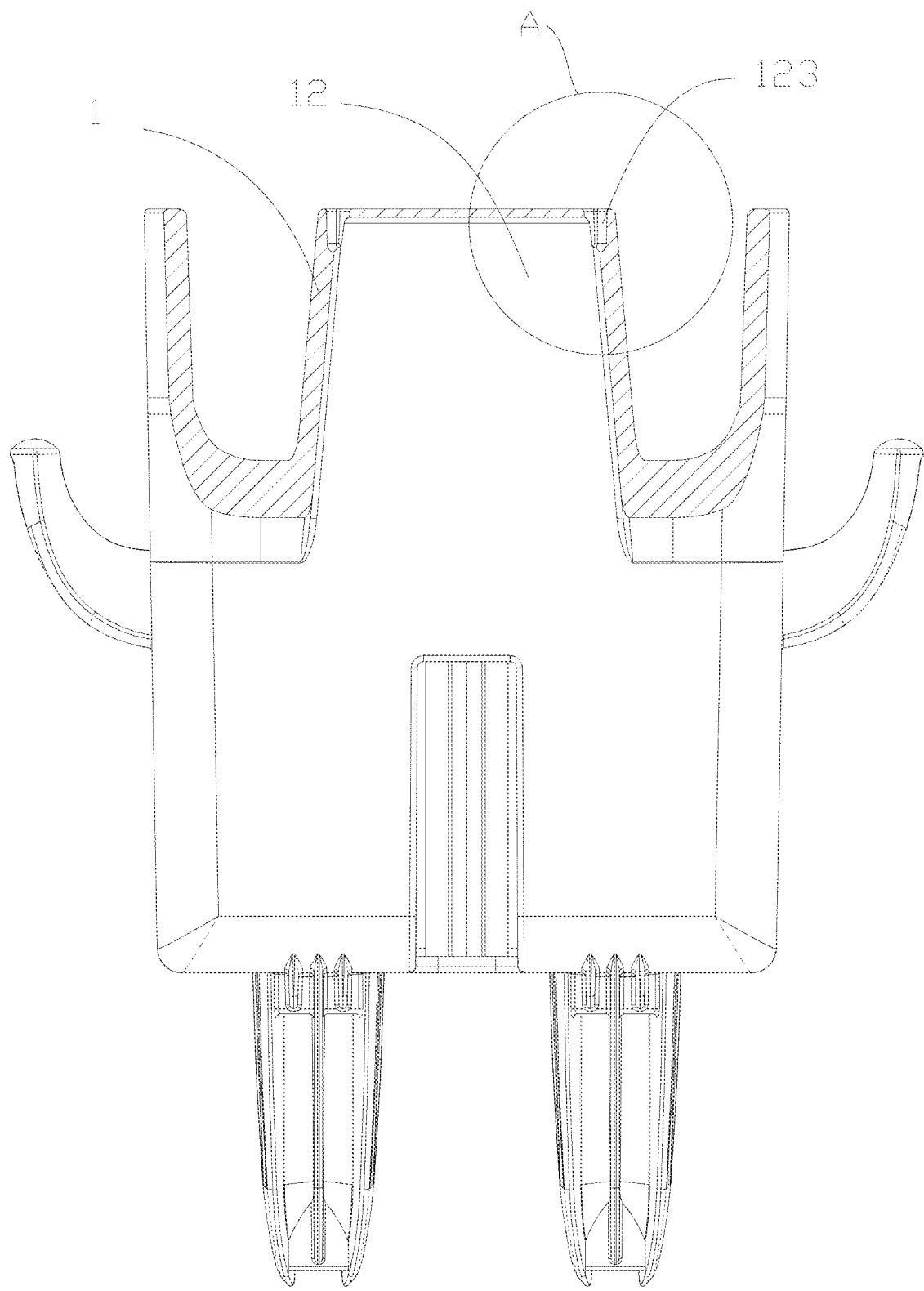
FIG. 4 is cross-sectional view cut away along a grove of the present disclosure.
Figure 5:
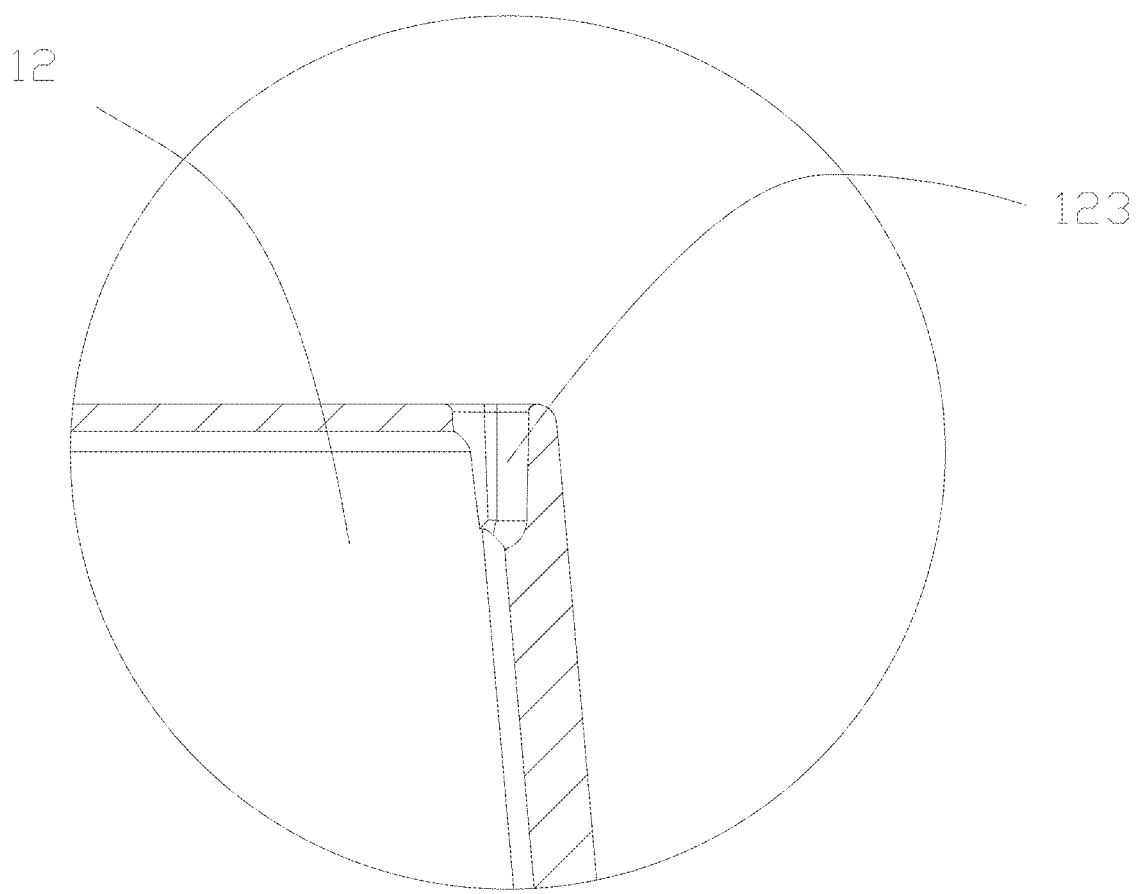
FIG. 5 is an enlarged diagram of a part A in FIG. 4.
Figure 6:
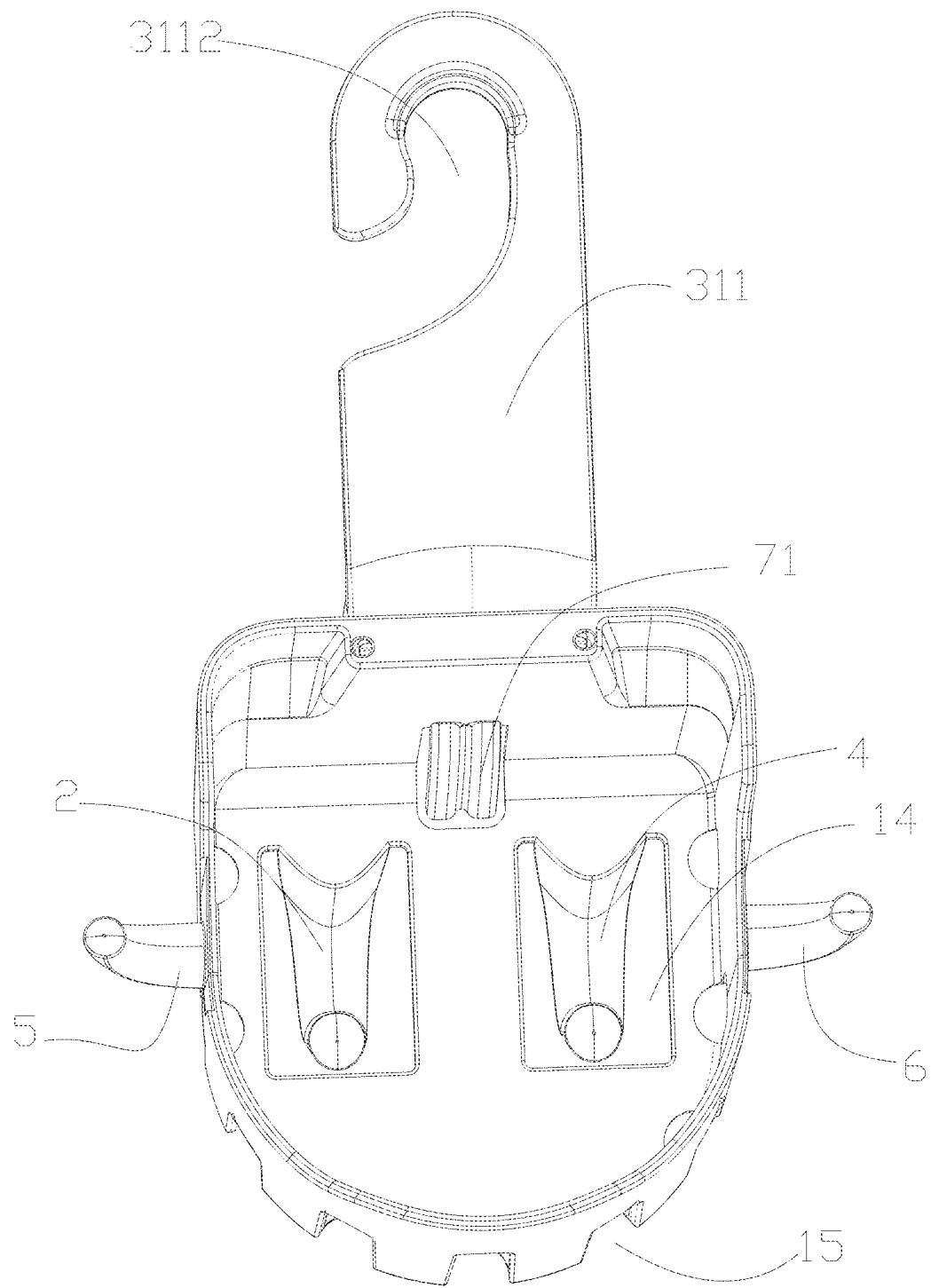
FIG. 6 is a top view of the present disclosure.
Figure 7:
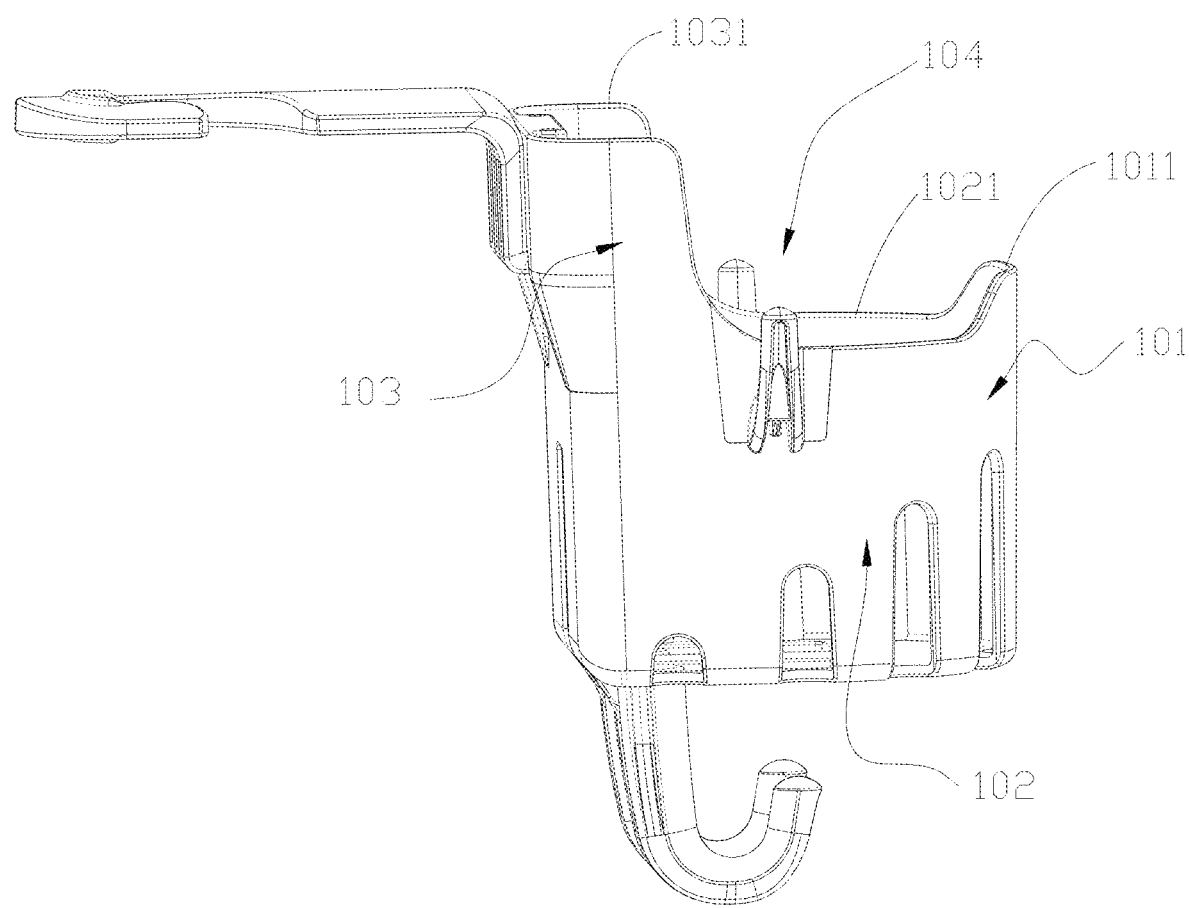
FIG. 7 is left view of the present disclosure.

Referring to FIG. 1 to FIG. 7, a multifunctional fixed bracket includes a bracket body 1; the bracket body 1 is provided with an accommodating chamber 11, and the accommodating chamber 11 is configured to place a container; and a first supporting body 2, wherein the first supporting body 2 is connected to the bracket body 1, and the first supporting body 2 is configured to hang items. Through the above structure, since the bracket body 1 is provided with the accommodating chamber 11, a user can place a container such as a water glass, a beverage bottle, and an umbrella into the accommodating chamber 11, and can hang an item such as a key, an earphone, a bag, and a garbage bag on a first supporting member at a bottom of the bracket body 1, fully using a space of the fixed bracket, increasing the versatility of the bracket, and allowing the user to store various items on one fixed bracket, thereby improving the space utilization rate and cleanliness.

In this implementation, the bracket body 1 is connected to a fixing device 3; and the bracket body 1 is connected to an automobile seat through the fixing device 3.

Further, the bracket body 1 is detachably connected to the fixing device 3. Through the above structure, the detachable design allows the bracket body 1 and the fixing device 3 to be disassembled for cleaning and maintenance, so that the service life of the bracket is prolonged. When the bracket is not in use, a user is allowed to disassemble the bracket body 1 and the fixing device 3 and store them, without occupying an interior space of a vehicle to facilitate storage.

In this implementation, the fixing device 3 includes a transverse fixing portion 31 and a longitudinal fixing portion 32; the transverse fixing portion 31 is configured to be connected to a metal rod of a headrest of an automobile; and the longitudinal fixing portion 32 is configured to fix and support the bracket body 1. Specifically, the transverse fixing portion 31 is a transverse fixing plate 311, and the transverse fixing plate 311 is provided with a clamping slot 3112 configured to be hung on the metal rod of the headrest of the automobile seat. Through the above structure, the transverse fixing plate 311 is sleeved and clamped into the metal rod of the headrest of the automobile seat through the clamping slot 3112. Due to the design of the clamping slot 3112, the fixing device 3 can be firmly hung on the metal rod, thus providing a stable support and preventing the fixing device 3 from shaking or falling off when a vehicle is in driving.

Further, the longitudinal fixing portion 32 is a longitudinal fixing plate 321; the longitudinal fixing plate 321 includes a first fixing plate 3211 and a second fixing plate 3212 which are connected into a U shape; the first fixing plate 3211 is connected to one end of the transverse fixing plate 311 away from the clamping slot 3112; and the second fixing plate 3212 is connected to one side of the first fixing plate 3211 away from the transverse fixing plate 311.

Further, a fixing slot 12 with a downward opening 121 is arranged on a back portion of the bracket body 1; and the fixing slot 12 clamps and sleeves the second fixing plate 3212 through the opening 121 of the bracket body 1. Through the above structure, since the fixing slot 12 with the downward opening 121 is arranged on the back portion of the bracket body 1, so that a user can align the fixing slot 12 of the bracket body 1 with the position of the second fixing plate 3212, and then sleeve the bracket body 1 on the second fixing plate 3212. As the fixing device 3 is firmly clamped to the metal rod of the headrest of the automobile seat, the bracket body 1 is also firmly fixed to a back of the automobile seat, facilitating the use. Furthermore, shaking or tilting does not easily occur. This ensures the stability and safety of the bracket body 1.

In this implementation, outwards protruding elastic buckles 3213 are arranged on left and right side walls of the second fixing plate 3212, and a groove 123 matched and clamped with the elastic buckles 3213 is arranged in the fixing slot 12. Through the above structure, in the process of sleeving and clamping the bracket body 1 into the second fixing plate 3212, the elastic buckles 3213 on the two sides are pressed together into the fixing slot 12. When the bracket body is completed sleeved, the elastic buckles 3213 slide into the groove 123. Under the action of elasticity, the elastic buckles are pushed into the groove 123, so that the elastic buckles 3213 are in clamping fit with the groove 123, which effectively stabilizes the fixed connection between the bracket body 1 and the fixing device 3, enhances the stability of connection, and prevents the bracket body 1 from falling off from the fixing device 3 when a vehicle is in driving.

A positioning protrusion 33 is further arranged between the first fixing plate 3211 and the second fixing plate 3212; a positioning groove 122 is arranged on one side, close to the opening 121, of the back portion of the bracket body 1; and the positioning protrusion 33 is matched and clamped with the positioning groove 122. Through the above structure, due to the design of the positioning protrusion 33 and the positioning groove 122, it is convenient for a user to quickly and accurately align the bracket body 1 with a mounting position. Furthermore, left and right movements of the bracket body 1 and the fixing device 3 are restrained, and the stability of connection between the bracket body 1 and the fixing device 3 is ensured.

In this implementation, a second supporting body 4 is further arranged at a bottom of the bracket body 1. Specifically, the first supporting body 2 and the second supporting body 4 are arranged at the bottom of the bracket body 1, and both the first supporting body 2 and the second supporting body 4 are hooks. Further, the first supporting body (2) and the second supporting body (4) are both U-shaped or J-shaped hooks, and a contact and connection part between the first supporting body 2 and the hung item and a contact and connection part between the second supporting body 4 and the hung item are arc-shaped. Through the above structure, both the first supporting body 2 and the second supporting body 4 use the U-shaped or J-shaped hook design, and the contact and connection parts with the hung item are arc-shaped. This design can ensure that the hung item is stably and firmly hung on the hooks and are not easy to slide or fall off. The arc-shaped design in the contact and connection parts with the hung item can effectively protect the hung item from being damaged or scratched, thereby reducing friction and pressure on the item, prolonging the service life of the item, and improving the user satisfaction and experience. Furthermore, items are orderly hung on the fixed bracket on the back of the automobile seat, so that a ground space and a seat space in a vehicle can be effectively saved, and a sitting environment is more spacious and comfortable, which is very helpful for long-distance traveling or daily commuting.

In this implementation, a third supporting body 5s is arranged on one side wall of the bracket body 1, and a fourth supporting body 6 is arranged on the other opposite side wall of the bracket body 1. Specifically, both the third supporting body and the fourth supporting body are hooks. Further, the third supporting body and the fourth supporting body are both U-shaped or J-shaped hooks, and a contact and connection part between the third supporting body 5 and the hung item and a contact and connection part between the fourth supporting body 6 and the hung item are arc-shaped. Through the above structure, by the use of the same hook design, a user can hang items on the side supporting bodies for easy taking. This increases a hanging space of the bracket. The user can select different positions to hang the items according to a need, and the convenience and flexibility of use are improved.

In this implementation, a pressing device 7 is arranged in the accommodating chamber 11; and when the container is placed in the accommodating chamber 11, the pressing device 7 presses the container against the accommodating chamber 11. Specifically, the pressing device 7 is an elastic sheet 71 protruding inwards from an inner wall of the bracket body 1. Through the above structure, the design of the clamping device 7 can ensure that the container is firmly pressed and not easy to shake or tilt when placed in the accommodating chamber 11. This can effectively prevent the container from shaking or tilting during driving, maintain the stability of the container, and prevent liquid from overflowing or prevent items from tilting. Due to the protruding design of the elastic sheet 71, the container in the accommodating chamber 11 can be subjected to a pressure when placed, thereby increasing friction and preventing the container from sliding or moving. This can effectively maintain the positional stability of the container and ensure that the container does not move unnecessarily as the vehicle is in driving.

In this implementation, the bracket body 1 includes a first portion 101, a second portion 102, and a third portion 103; the first portion 101 is connected to one side of the second portion 102; the third portion 103 is connected to the other side of the second portion 102; the first portion 101 is provided with a first top wall 1011; the second portion 102 is provided with a second top wall 1021; the third portion 103 is provided with a third top wall 1031; the second top wall is lower than the first top wall 1011 and the third top wall 1031, so that a sunken supporting slot 104 is formed in an upper part of the bracket body 1; and the supporting slot 104 is configured to place and support a mobile phone. Further, the third top wall 1031 is higher than the first top wall 1011. Through the above structure, the first portion 101, the second portion 102, and the third portion 103 of the bracket body 1 form a stable supporting structure. The sunken supporting slot 104 is formed on the upper wall of the bracket body 1, which can effectively place and support a mobile phone or another device. Through the design of the third top wall 1031 being higher than the first top wall 1011, the bracket body 1 forms a tilted supporting angle, which helps to increase a viewing angle of a screen of a mobile phone, so that a user can view content on the mobile phone more comfortably, and the neck fatigue caused by long-term use of the mobile phone.

In this implementation, a first air vent 14 is arranged at a bottom of the bracket body 1, and a second air vent 15 is arranged on a surrounding wall of the bracket body 1. Through the above structure, the arrangement of air vents can not only facilitate the ventilation and heat dissipation of the bracket itself, but also facilitate the heat dissipation inside the container such as a water glass. Especially when a water glass containing hot or cold drink is placed on the bracket, the air vents can accelerate the heat transfer and dissipation inside the water glass, so that the temperature of the drink is more uniform, and the user experience is enhanced. The arrangement of the air vents can effectively reduce the overall weight of the bracket, reduce the amount of materials used, reduce the weight of the bracket, make the bracket lighter and convenient to carry and use, and reduce the stacking and processing difficulty of materials, reduce the production costs, and improve the production efficiency.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:
1. A multifunctional fixed bracket, comprising:
 a bracket body (1), wherein the bracket body (1) is provided with an accommodating chamber (11), and the accommodating chamber (11) is configured to place a container;

a first supporting body (2), wherein the first supporting body (2) is connected to the bracket body (1), and the first supporting body (2) is configured to hang items; and a fixing device (3), wherein the fixing device (3) is configured to be connected to the bracket body (1); and the bracket body (1) is capable of being connected to an automobile seat through the fixing device (3), the fixing device (3) comprises a transverse fixing portion (31) and a longitudinal fixing portion (32), the transverse fixing portion (31) is configured to be connected to a metal rod of a headrest of an automobile, the longitudinal fixing portion (32) is configured to fix and support the bracket body (1), the transverse fixing portion (31) is a transverse fixing plate (311), and the transverse fixing plate (311) is provided with a clamping slot (3112) configured to be hung on the metal rod of the headrest of the automobile seat;

wherein the longitudinal fixing portion (32) is a longitudinal fixing plate (321); the longitudinal fixing plate (321) comprises a first fixing plate (3211) and a second fixing plate (3212) which are connected into a U shape, the first fixing plate (3211) is connected to one end of the transverse fixing plate (311) away from the clamping slot (3112), and the second fixing plate (3212) is connected to one side of the first fixing plate (3211) away from the transverse fixing plate (311) and configured to be connected to the bracket body (1).

2. The multifunctional fixed bracket according to claim 1, wherein the bracket body (1) is detachably connected to the fixing device (3).

3. The multifunctional fixed bracket according to claim 1, wherein a first air vent (14) is arranged at a bottom of the bracket body (1), and a second air vent (15) is arranged on a surrounding wall of the bracket body (1).

4. The multifunctional fixed bracket according to claim 1, further comprising a second supporting body (4) connected to the bracket body (1), and the second supporting body (4) is configured to hang items.

5. The multifunctional fixed bracket according to claim 4, wherein the first supporting body (2) and the second supporting body (4) are arranged at a bottom of the bracket body (1), and both the first supporting body (2) and the second supporting body (4) are hooks.

6. The multifunctional fixed bracket according to claim 5, wherein the first supporting body (2) and the second supporting body (4) are both U-shaped or J-shaped hooks, and a contact and connection part between the first supporting body (2) and the hung item and a contact and connection part between the second supporting body (4) and the hung item are arc-shaped.

7. The multifunctional fixed bracket according to claim 1, wherein a third supporting body (5) is arranged on one side wall of the bracket body (1), and a fourth supporting body (6) is arranged on the other opposite side wall of the bracket body (1).

8. The multifunctional fixed bracket according to claim 7, wherein both the third supporting body (5) and the fourth supporting body (6) are hooks.

9. The multifunctional fixed bracket according to claim 8, wherein the third supporting body and the fourth supporting body are both U-shaped or J-shaped hooks, and a contact and connection part between the third supporting body (5) and the hung item and a contact and connection part between the fourth supporting body (6) and the hung item are arc-shaped.

10. The multifunctional fixed bracket according to claim 1, wherein a pressing device (7) is arranged in the accommodating chamber (11); and when the container is placed in the accommodating chamber (11), the pressing device (7) presses the container against the accommodating chamber (11).

11. The multifunctional fixed bracket according to claim 10, wherein the pressing device (7) is an elastic sheet (71) protruding inwards from an inner wall of the bracket body (1).

12. The multifunctional fixed bracket according to claim 1, wherein a fixing slot (12) with a downward opening (121) is arranged on a back portion of the bracket body (1); and the fixing slot (12) clamps and sleeves the second fixing plate (3212) through the opening (121) of the bracket body (1).

13. The multifunctional fixed bracket according to claim 12, wherein outwards protruding elastic buckles (3213) are arranged on left and right side walls of the second fixing plate (3212), and a groove (123) matched and clamped with the elastic buckles (3213) is arranged in the fixing slot (12).

14. The multifunctional fixed bracket according to claim 12, wherein a positioning protrusion (33) is further arranged between the first fixing plate (3211) and the second fixing plate (3212); a positioning groove (122) is arranged on one side, close to the opening (121), of the back portion of the bracket body (1); and the positioning protrusion (33) is matched and clamped with the positioning groove (122).

15. The multifunctional fixed bracket according to claim 1, wherein the bracket body (1) comprises a first portion (101), a second portion (102), and a third portion (103); the first portion (101) is connected to one side of the second portion (102); the third portion (103) is connected to the other side of the second portion (102); the first portion (101) is provided with a first top wall (1011); the second portion (102) is provided with a second top wall (1021); the third portion (103) is provided with a third top wall (1031); the second top wall is lower than the first top wall (1011) and the third top wall (1031), so that a sunken supporting slot (104) is formed in an upper part of the bracket body (1); and the supporting slot (104) is configured to place and support a mobile phone.

16. The multifunctional fixed bracket according to claim 15, wherein the third top wall (1031) is higher than the first top wall (1011).

17. A multifunctional fixed bracket, comprising:

a bracket body (1), wherein the bracket body (1) is provided with an accommodating chamber (11), and the accommodating chamber (11) is configured to place items, the accommodating chamber (11) has a bottom and a peripheral sidewall extending from the bottom to enclose the accommodating chamber (11), and the accommodating chamber (11) comprises a plurality of spaced first air vents (14) arranged at the bottom, and a plurality of spaced second air vents (15) arranged at the peripheral sidewall, the second air vents (15) each have one end thereof extending to the bottom, and multiple of the second air vents (15) have different lengths at the peripheral sidewall; and a first supporting body (2), wherein the first supporting body (2) is connected to the bracket body (1), and the first supporting body (2) is configured to hang items.

18. A multifunctional fixed bracket, comprising:

a bracket body (1), wherein the bracket body (1) is provided with an accommodating chamber (11), the accommodating chamber (11) is configured to place at least one item, and the accommodating chamber (11)

comprises a bottom and a peripheral sidewall extending from the bottom to enclose the accommodating chamber (11);

a first supporting body (2) and a second supporting body (4), wherein the first supporting body (2) and the second supporting body (4) are connected to the bracket body (1) at the bottom, and the first supporting body (2) and the second supporting body (4) are configured to hang items;

a third supporting body (5) and a fourth supporting body (6), wherein the third supporting body (5) is arranged on one side wall of the bracket body (1), and the fourth supporting body (6) is arranged on opposite the other side wall of the bracket body (1), and the third supporting body (5) and the fourth supporting body (6) are configured to hang items;

wherein each of the first supporting body (2), the second supporting body (4), the third supporting body (5) and the fourth supporting body (6) is a hook, and the third supporting body (5) and the fourth supporting body (6) each extend laterally outwards to provide an extended lateral space for hanging items, wherein the bracket body (1) is connected to a fixing device (3); and the bracket body (1) is capable of being connected to an automobile seat through the fixing device (3), the fixing device (3) comprises a transverse fixing portion (31) and a longitudinal fixing portion (32), the transverse fixing portion (31) is configured to be connected to a metal rod of a headrest of an automobile, the longitudinal fixing portion (32) is configured to fix and support the bracket body (1), and the longitudinal fixing portion (32) comprises a first fixing plate (3211) and a second fixing plate (3212) which are connected into a U shape, the first fixing plate (3211) is connected to one end of the transverse fixing portion (31), and the a second fixing plate (3212) is configured to be connected to the bracket body (1).

\* \* \* \* \*